(12) United States Patent
Agness et al.

(10) Patent No.: US 9,245,540 B1
(45) Date of Patent: Jan. 26, 2016

(54) VOICE COIL MOTOR TEMPERATURE SENSING CIRCUIT TO REDUCE CATASTROPHIC FAILURE DUE TO VOICE COIL MOTOR COIL SHORTING TO GROUND

(71) Applicant: Western Digital Technologies, Inc., Irvine, CA (US)

(72) Inventors: John R. Agness, Laguna Hills, CA (US); William K. Laird, Corona, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 14/526,618

(22) Filed: Oct. 29, 2014

(51) Int. Cl.
*G11B 5/02* (2006.01)
*G11B 5/55* (2006.01)
*H02H 3/08* (2006.01)
*G11B 5/40* (2006.01)

(52) U.S. Cl.
CPC ........... *G11B 5/022* (2013.01); *G11B 5/40* (2013.01); *G11B 5/5565* (2013.01); *H02H 3/085* (2013.01)

(58) Field of Classification Search
None
See application file for complete search history.

(56) References Cited

U.S. PATENT DOCUMENTS

| | | |
|---|---|---|
| 5,128,813 A | 7/1992 | Lee |
| 5,594,603 A | 1/1997 | Mori et al. |
| 5,760,563 A | 6/1998 | Bennett |
| 5,808,438 A * | 9/1998 | Jeffrey ........................ 318/634 |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,396,243 B2 * | 5/2002 | Odaohhara ................... 320/116 |
| 6,462,896 B1 | 10/2002 | Codilian et al. |
| 6,476,996 B1 | 11/2002 | Ryan |
| 6,484,577 B1 | 11/2002 | Bennett |

(Continued)

*Primary Examiner* — Wayne Young
*Assistant Examiner* — James L Habermehl

(57) ABSTRACT

An electrical circuit includes: a controlled switch; one or more temperature sensors in thermal contact with the controlled switch; and a control unit configured to: receive a temperature signal from the one or more temperature sensors; compare the received temperature signal to a predetermined threshold; and in response to the received temperature signal exceeding the predetermined threshold, render the controlled switch inoperative.

27 Claims, 5 Drawing Sheets

(56) References Cited

U.S. PATENT DOCUMENTS

| | | |
|---|---|---|
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,178 B2 | 7/2004 | Shibata |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,738 B2 * | 7/2005 | Fujiwara et al. ............ 360/75 |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |

(56) References Cited

U.S. PATENT DOCUMENTS

| | | | |
|---|---|---|---|
| 7,542,225 B1 | 6/2009 | Ding et al. | |
| 7,548,392 B1 | 6/2009 | Desai et al. | |
| 7,551,390 B1 | 6/2009 | Wang et al. | |
| 7,558,016 B1 | 7/2009 | Le et al. | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,626,782 B1 | 12/2009 | Yu et al. | |
| 7,630,162 B2 | 12/2009 | Zhao et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,663,835 B1 | 2/2010 | Yu et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,697,233 B1 | 4/2010 | Bennett et al. | |
| 7,701,661 B1 | 4/2010 | Bennett | |
| 7,710,676 B1 | 5/2010 | Chue | |
| 7,715,138 B1 | 5/2010 | Kupferman | |
| 7,729,079 B1 | 6/2010 | Huber | |
| 7,733,189 B1 | 6/2010 | Bennett | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,760,461 B1 | 7/2010 | Bennett | |
| 7,782,002 B2 * | 8/2010 | Cook, II | 318/471 |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,830,104 B2 * | 11/2010 | Takeuchi | 318/400.01 |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 7,969,228 B2 * | 6/2011 | Bernstein | 327/513 |
| 8,000,053 B1 | 8/2011 | Anderson | |
| 8,030,719 B2 | 10/2011 | Li et al. | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,390,367 B1 | 3/2013 | Bennett | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,904 B1 | 6/2014 | Liang et al. | |
| 8,760,796 B1 | 6/2014 | Lou et al. | |
| 8,767,332 B1 | 7/2014 | Chahwan et al. | |
| 8,767,343 B1 | 7/2014 | Helmick et al. | |
| 8,767,354 B1 | 7/2014 | Ferris et al. | |
| 8,773,787 B1 | 7/2014 | Beker | |
| 8,779,574 B1 | 7/2014 | Agness et al. | |
| 8,780,473 B1 | 7/2014 | Zhao et al. | |
| 8,780,477 B1 | 7/2014 | Guo et al. | |
| 8,780,479 B1 | 7/2014 | Helmick et al. | |
| 8,780,489 B1 | 7/2014 | Gayaka et al. | |
| 8,792,202 B1 | 7/2014 | Wan et al. | |
| 8,797,664 B1 | 8/2014 | Guo et al. | |
| 8,804,267 B2 | 8/2014 | Huang et al. | |
| 8,824,081 B1 | 9/2014 | Guo et al. | |
| 8,824,262 B1 | 9/2014 | Liu et al. | |
| 9,000,750 B2 * | 4/2015 | Yu et al. | 324/105 |
| 2002/0111756 A1 * | 8/2002 | Modgil | 702/63 |
| 2006/0032076 A1 * | 2/2006 | Evanyk et al. | 34/96 |
| 2010/0035085 A1 | 2/2010 | Jung et al. | |
| 2012/0284493 A1 | 11/2012 | Lou et al. | |
| 2012/0293017 A1 * | 11/2012 | Lidsky et al. | 307/126 |
| 2013/0120870 A1 | 5/2013 | Zhou et al. | |
| 2013/0148240 A1 | 6/2013 | Ferris et al. | |

* cited by examiner

VOICE COIL MOTOR TEMPERATURE SENSING CIRCUIT TO REDUCE CATASTROPHIC FAILURE DUE TO VOICE COIL MOTOR COIL SHORTING TO GROUND

BACKGROUND

1. Technical Field

Apparatuses and methods consistent with the present inventive concept relate to current sensing, and more particularly to sensing overcurrent conditions in a voice coil motor circuit.

2. Related Art

During the lifetime of a data storage device there is a potential for metal debris resulting from internal component wear to come in contact with the coil of the voice coil motor (VCM). Over time this metal could damage the coil causing a short circuit to ground in the VCM drive circuitry. As a result, a large amount of current flowing to ground through the VCM drive circuitry and power supply circuitry can cause the affected printed circuit board assemblies to burn.

Conventionally, electronic fuses (E-fuses) may be used for over voltage and overcurrent protection. However, the response time of an E-fuse is insufficient to prevent damage caused by the rapid discharge of current built up in it in the inductance of the VCM coil resulting from a short circuit to ground.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

Figure 1:
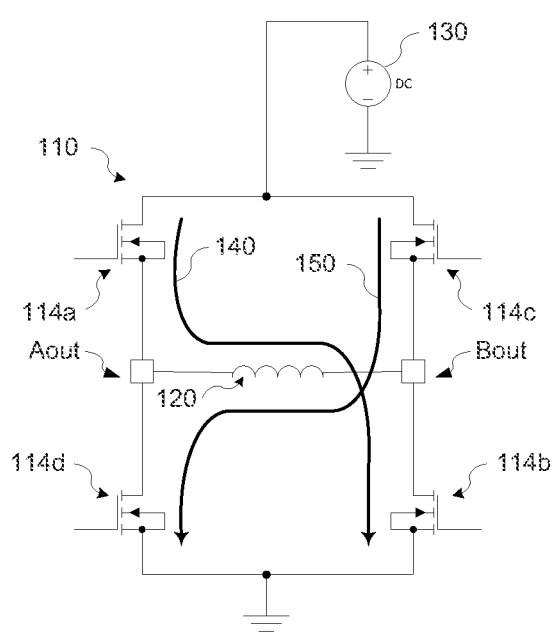
FIG. 1 is a diagram illustrating current flow in a conventional H-bridge circuit.

The drive circuit for a VCM provides high current to permit the VCM to rapidly move a read-write head actuator arm across a recording medium. A conventional drive circuit for a VCM may be configured as an H-bridge circuit. FIG. 1 is a diagram illustrating current flow in a conventional H-bridge circuit.

Referring to FIG. 1, the conventional H-bridge circuit 110 may include a first controlled switch 114a, a second controlled switch 114b, a third controlled switch 114c, a fourth controlled switch 114d, and a VCM 120. The controlled switches may be, for example, but not limited to, field-effect transistors (FETs) or other circuit elements or semiconductor or mechanical/electromechanical switches. One of ordinary skill in the art will appreciate that each of the controlled switches may include more than one switching device or circuit element without departing from the scope of the present inventive concept.

To move the read-write head actuator arm in a first direction, the first controlled switch 114a and the second controlled switch 114b may be activated while the third controlled switch 114c and the fourth controlled switch 114d remain inactive permitting current to flow in a first direction 140 through the first controlled switch 114a, the VCM 120, and the second controlled switch 114b causing the read-write head actuator arm 420 (refer to FIG. 4) to move in the first direction. To move the read-write head actuator arm in a second (opposite) direction, the first controlled switch 114a and the second controlled switch 114b may be deactivated while the third controlled switch 114c and the fourth controlled switch 114d are activated permitting current to flow in a second direction 150 through the third controlled switch 114c, the VCM 120, and the fourth controlled switch 114d causing the read-write head actuator arm 420 (refer to FIG. 4) to move in the second direction. The current flow through the VCM 120 stores energy in a magnetic field in the inductance of the VCM 120.

If the VCM 120 coil becomes damaged causing a short circuit to ground a large current may flow through one or more of the controlled switches 114a-114d from the power supply 130 and/or the energy stored in the magnetic field in the inductance of the VCM 120. An increase in current flowing through any of the controlled switches 114a-114d may cause a rise in operating temperature of the controlled switches 114a-114d having the increased current flow. Therefore, the increased current flow may be sensed based on sensing a rise in operating temperature of the controlled switches 114a-114d.

Current Sensing Based on Temperature

Figure 2A:
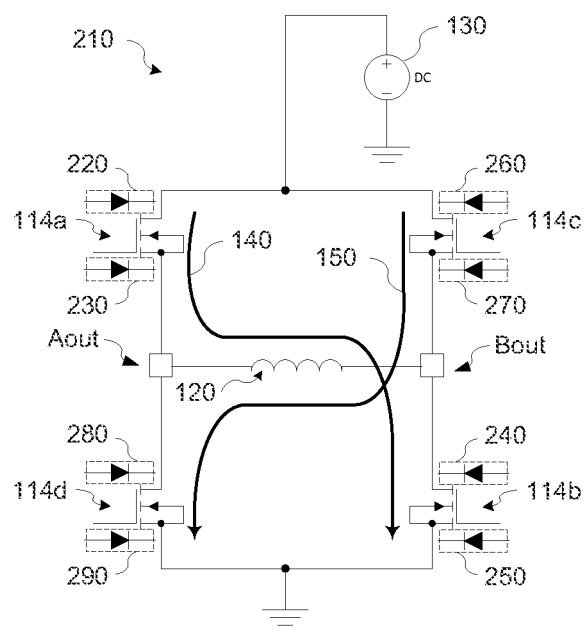
FIG. 2A is a diagram illustrating an H-bridge circuit having temperature sensors according to various embodiments of the present inventive concept.

FIG. 2A is a diagram illustrating an H-bridge circuit 210 having temperature sensors according to various embodiments of the present inventive concept. Referring to FIG. 2A, at least two temperature sensors 220-290 may be provided for each controlled switch 114a-114d. The temperature sensors 220-290 may be, for example, but not limited to, diode temperature sensors or other semiconductor junction devices. Operating temperatures of the controlled switches 114a-114d may be sensed by the temperature sensors 220-290 and converted to electrical signals representing the temperatures.

Figure 2B:
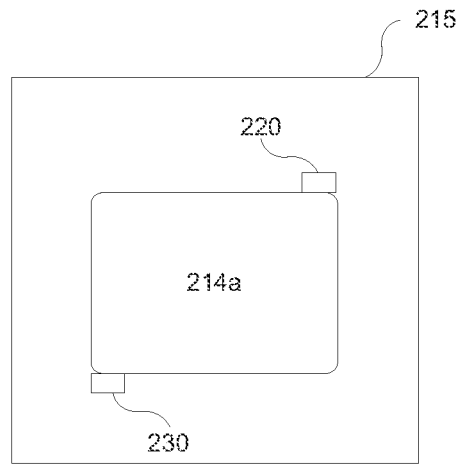
FIG. 2B is a diagram illustrating placement of temperature sensors relative to a controlled switch of an H-bridge circuit according to various embodiments of the present inventive concept.

FIG. 2B is a diagram illustrating placement of temperature sensors relative to a controlled switch of an H-bridge circuit according to various embodiments of the present inventive concept. Referring to FIG. 2B, the temperature sensors 220, 230 may be integrated on a semiconductor die 215 in conjunction with formation of a controlled switch 214a thereby ensuring that the temperature sensors 220, 230 are in thermal contact with the controlled switch 214a. In some embodiments, the temperature sensors 220, 230 may be formed on the semiconductor die 215 at opposite corners of the controlled switch 214a structure. In some embodiments, the controlled switch 214a may be, for example, but not limited to, an FET, and the temperature sensors 220, 230 may be formed on the semiconductor die 215 at opposite corners of the FET structure.

Figure 3:
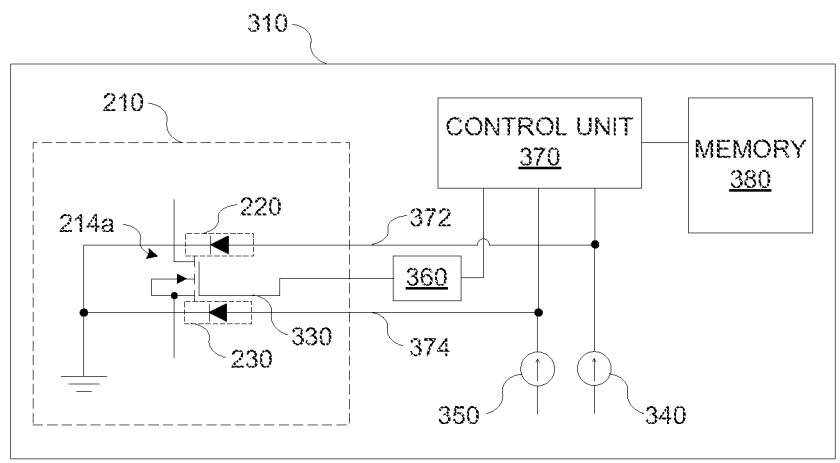
FIG. 3 is a diagram illustrating an electrical circuit according to various embodiments of the present inventive concept.

FIG. 3 is a diagram illustrating an electrical circuit 310 according to various embodiments of the present inventive concept. Referring to FIGS. 2A and 3, the electrical circuit 310 may include an H-bridge circuit 210, drive circuitry 360 for the H-bridge circuit 210, a control unit 370, and a memory 380. The memory 380 may be nonvolatile memory, for example, but not limited to, EPROM memory, EEPROM memory, etc. The H-bridge circuit 210 may include a plurality of controlled switches 214a-214d and a plurality of temperature sensors 220-290.

The drive circuitry 360 may be electrically connected to a control terminal 330 of each of the plurality of controlled switches 214a-214d. The control unit 370 may control the drive circuitry 360 to cause the drive circuitry 360 to activate and deactivate the controlled switches 214a-214d as required to cause the VCM 120 to move the read-write head actuator arm 420 (refer to FIG. 4).

At least two temperature sensors 200-290 may be provided for each of the controlled switches 214a-214d. Referring to FIG. 3, one representative controlled switch 214a and two representative temperature sensors 220, 230 are illustrated. The temperature sensors 200, 230 may be in thermal contact with the controlled switch 214a to sense the operating temperature of the controlled switch 214a.

In some embodiments, a diode temperature sensor 220, 230 may be provided with current from a current source 340, 350. With a constant current applied, the voltage across the diode temperature sensor 220, 230 will decrease by approximately 1 to 2 mV/° C. over temperature. The voltage change over temperature may be used with a look up table or an equation to calculate a temperature.

In some embodiments, operating temperatures of the controlled switches 214a-214d of the H-bridge circuit 210 may be characterized over different operating conditions for the VCM 120 and temperature profiles stored in the memory 380. An absolute maximum operating temperature for the controlled switches 214a-214d may also be stored in the memory 380.

Referring again to FIG. 3, the control unit 370 may receive electrical signals 372, 374 representing the operating temperature (i.e., temperature signals) of the controlled switch 214a from the temperature sensors 220, 230. The control unit 370 may compare the operating temperature indicated by each of the temperature signals 372, 374 from the temperature sensors 220, 230 to a predetermined threshold, for example, the absolute maximum operating temperature stored in the memory 380.

If any of the temperature signals 372, 374 exceeds the predetermined threshold, the increased temperature may indicate an overcurrent condition in the H-bridge circuit 210, for example, due to a short circuit to ground in the VCM 120 coil. In response, the control unit 370 may record the increased temperature as an over-temperature event in a designated field of a Drive Reliability Management (DRM) log on the storage medium 430 (refer to FIG. 4). The control unit 370 may then render all of the controlled switches 214a-214d inoperative by causing the drive circuitry 360 to command the controlled switches 214a-214d to a state that prevents electrical current flow through the controlled terminals (e.g., the drain and source terminals on an FET) of the controlled switches 214a-214d. For example, the drive circuitry 360 may provide a signal to the control terminal 330 of the controlled switch 214a to deactivate the controlled switch 214a, or the controlled switch 214a may otherwise be commanded to a high impedance state. Information recorded in the DRM log may subsequently be accessed from the storage medium 430 of a failed data storage device 410 (refer to FIG. 4).

Alternatively or additionally, the control unit 370 may compare the operating temperature of each controlled switch 214a-214d to the operating temperature of every other controlled switch 214a-214d. The control unit 370 may determine an operating temperature for the controlled switch 214a from the temperature signals 372, 374 received from the temperature sensors 220, 230 of the controlled switch 214a. For example, the control unit 370 may average the temperature signals 372, 374 received from the temperature sensors 220, 230 of the controlled switch 214a to generate an operating temperature for the controlled switch 214a. The control unit 370 may compare the operating temperature of the controlled switch 214a to similarly determined operating temperatures of each of the other controlled switches 214b-214d in the H-bridge circuit 210.

If the control unit 370 determines that the operating temperature of the controlled switch 214a is greater than a predetermined amount, for example about 5-10° C., compared to the operating temperature of any other of the controlled switches 214b-214d, an overcurrent condition, for example, a short circuit to ground in the VCM 120 coil, may be indicated. In response, the control unit 370 may record the increased temperature as an over-temperature event in a designated field of a Drive Reliability Management (DRM) log on the storage medium 430 (refer to FIG. 4). The control unit 370 may then render all of the controlled switches 214a-214d inoperative. Information recorded in the DRM log may subsequently be accessed from the storage medium 430 of a failed data storage device 410 (refer to FIG. 4).

The predetermined amount of temperature difference between the operating temperatures of the controlled switches 214a-214d may vary based on the temperature profiles of the controlled switches 214a-214d characterized over different operating conditions stored in the memory 380.

One of ordinary skill in the art will appreciate that other methods of determining the operating temperatures of the controlled switches and comparing operating temperatures of the controlled switches with each other may be performed without departing from the scope of the present inventive concept.

Although operation of the electrical circuit 310 has been described with respect to one controlled switch 214a and associated temperature sensors 220, 230 of the H-bridge circuit 210, one of ordinary skill in the art will appreciate that operation of the electrical circuit 310 extends to each controlled switch 214a-214d and associated temperature sensors 220-290.

Figure 4:
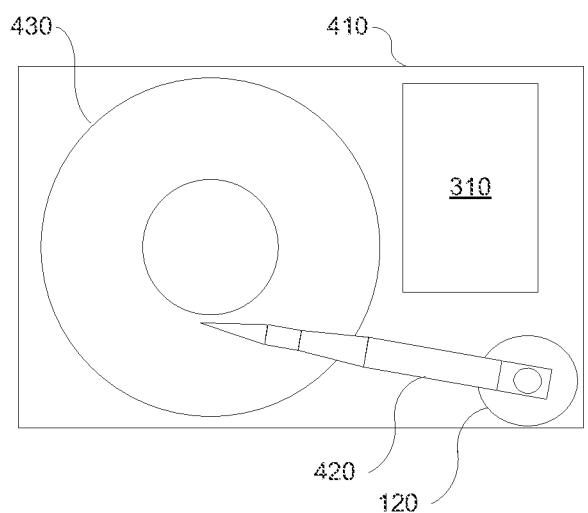
FIG. 4 is a diagram illustrating an electrical circuit in a data storage device according to various embodiments of the present inventive concept.

FIG. 4 is a diagram illustrating an electrical circuit 310 in a data storage device (DSD) 410 according to various embodiments of the present inventive concept. Referring to FIG. 4, the electrical circuit 310 in the DSD 410 may control the VCM 120 to move the read-write head actuator arm 420 across a storage medium 430.

When an overcurrent condition is detected in the H-bridge circuit 210, the control unit 370 may cause the electrical circuit 310 to initiate one or more predetermined operations prior to rendering the controlled switches 214a-214d inoperative. For example, the control unit 370 may cause the electrical circuit 310 to initiate an emergency power-off retract (EPOR) of the read-write head actuator arm 420 from the storage medium 430. One of ordinary skill in the art will appreciate that other operations may be initiated prior to rendering the controlled switches 214a-214d inoperative without departing from the scope of the present inventive concept.

Figure 5:
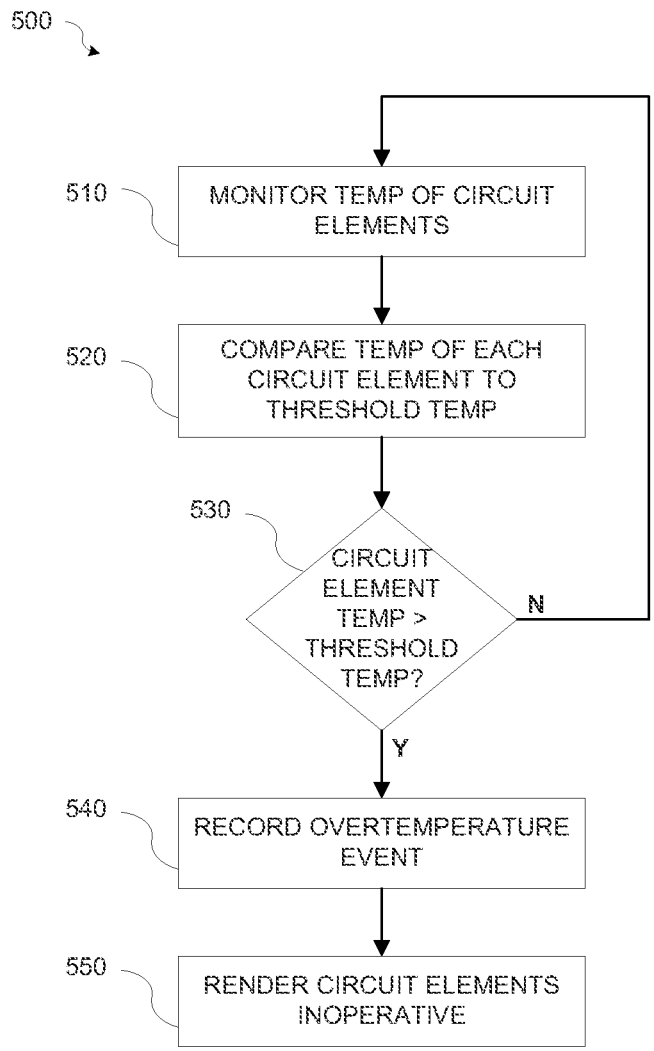
FIG. 5 is a flow chart illustrating a method according to various embodiments of the present inventive concept.

FIG. 5 is a flow chart illustrating a method 500 according to various embodiments of the present inventive concept. Referring to FIGS. 2A, 3, and 5, the control unit 370 may monitor the temperature of one or more circuit elements (e.g., the controlled switches 114a-114d) sensed by temperature sensors (e.g., the diode temperature sensors 220-290) (510). Each of the circuit elements may be provided with at least two temperature sensors.

The control unit 370 may compare the temperature sensed by each of the temperature sensors to a predetermined threshold (520). The predetermined threshold may correspond to an absolute maximum temperature rating of the circuit elements being monitored and may be stored in the memory 380. If the control unit 370 determines that none of the monitored circuit element temperatures exceeds the predetermined threshold (530—N), the control unit 370 may continue to monitor the temperature of the one or more circuit elements (510).

If the control unit 370 determines that at least one of the monitored circuit element temperatures exceeds the predetermined threshold (530—Y), the control unit 370 may record an over-temperature event in a designated field of the DRM log (540). The control unit 370 may then render the circuit elements inoperative (550).

The control unit 370 may render all of the circuit elements 214a-214d inoperative by commanding the circuit elements 214a-214d to a state that prevents electrical current flow through the circuit elements 214a-214d. For example, the control unit 370 may provide a signal to deactivate the circuit elements 214a-214d, or the circuit elements 214a-214d may otherwise be commanded to a high impedance state.

Figure 6:
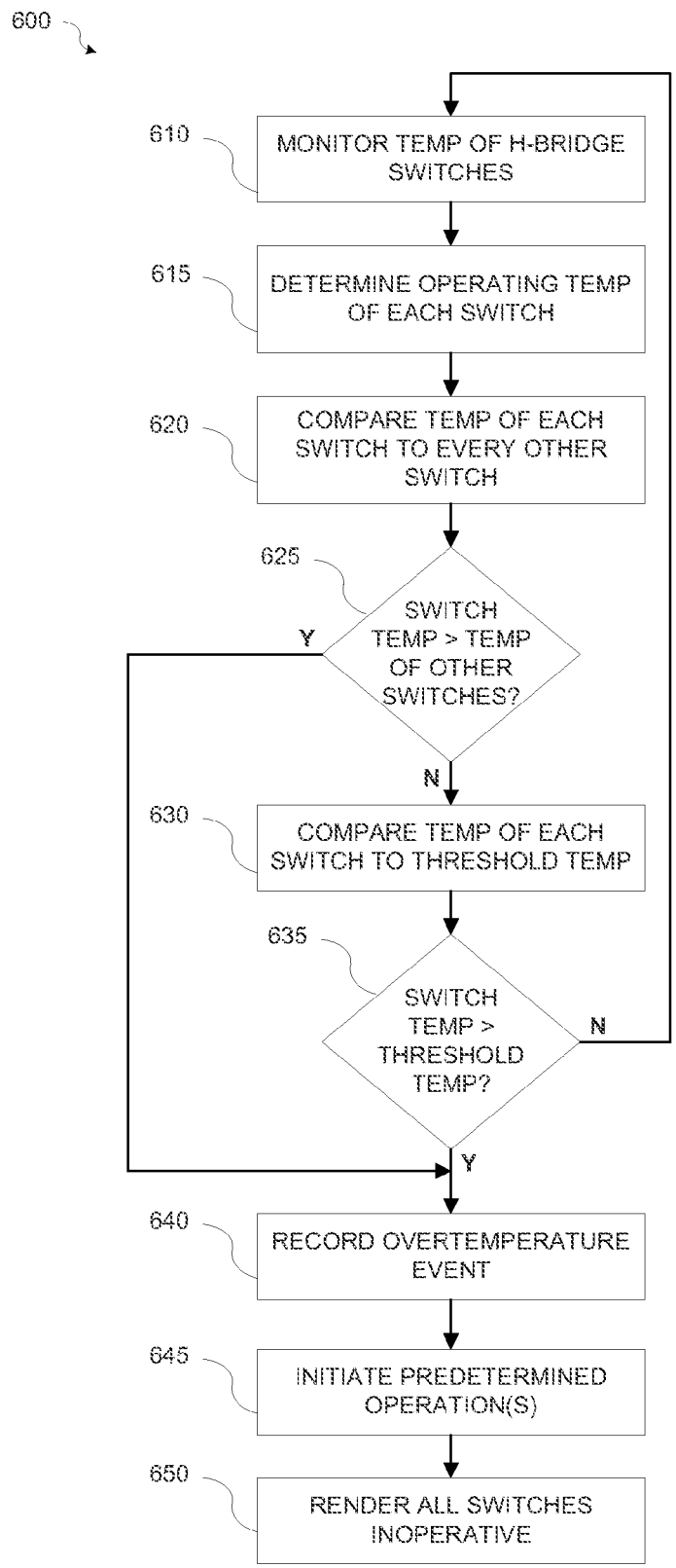
FIG. 6 is a flow chart illustrating a method according to various embodiments of the present inventive concept.

FIG. 6 is a flow chart illustrating a method 600 according to various embodiments of the present inventive concept. Referring to FIGS. 2A, 3, and 6, the control unit 370 may monitor the temperature of one or more controlled switches 114a-114d of the H-bridge circuit 210 sensed by temperature sensors (e.g., the diode temperature sensors 220-290) (610). The controlled switches 114a-114d may be for example, but not limited to, FETs or other circuit elements, semiconductor or mechanical/electromechanical switches. Each of the controlled switches 114a-114d may be provided with at least two temperature sensors 220-290.

The control unit 370 may determine an operating temperature for the controlled switch 214a from the temperature signals 372, 374 received from the temperature sensors 220, 230 of the controlled switch 214a (615). For example, the control unit 370 may average the temperature signals 372, 374 received from the temperature sensors 220, 230 of the controlled switch 214a to generate an operating temperature for the controlled switch 214a.

The control unit 370 may compare the operating temperature of the controlled switch 214a to similarly determined operating temperatures of each of the other controlled switches 214b-214d in the H-bridge circuit 210 (620). If the control unit 370 determines that the operating temperature of the controlled switch 214a is greater than a predetermined amount for example about 5-10° C., compared to the operating temperature of any other of the controlled switches 214b-214d (625—Y), an overcurrent condition, for example, a short circuit to ground in the VCM 120 coil, may be indicated.

In response to the detected overcurrent condition, the control unit 370 may record an over-temperature event in a designated field of the DRM log (640). The control unit 370 may cause the electrical circuit 310 to initiate one or more predetermined operations (645). For example, the control unit 370 may cause the electrical circuit 310 to initiate an emergency power-off retract (EPOR) of the read-write head actuator arm 420. The control unit 370 may then render all of the controlled switches 214a-214d inoperative (650).

If the control unit 370 determines that the operating temperature of the controlled switch 214a is not greater than a predetermined amount compared to the operating temperature of any other of the controlled switches 214b-214d (625—N), the control unit 370 may compare the operating temperatures of each of the controlled switches 214a-214d or the temperature signals from each of the temperature sensors 220-290 to a predetermined threshold (630). The predetermined threshold may correspond to an absolute maximum temperature rating of the circuit elements (e.g., controlled switches 214a-214d) being monitored and may be stored in the memory 380.

If the operating temperatures of any of the controlled switches 214a-214d or a temperature signal from any of the temperature sensors 220-290 does not exceed the predetermined threshold (635—N), the control unit 370 may continue to monitor the temperature of one or more controlled switches 114a-114d (610). If the operating temperatures of any of the controlled switches 214a-214d or a temperature signal from any of the temperature sensors 220-290 exceeds the predetermined threshold (635—Y), an overcurrent condition, for example, a short circuit to ground in the VCM 120 coil, may be indicated.

In response to the detected overcurrent condition, the control unit 370 may record an over-temperature event in a designated field of the DRM log (640). The control unit 370 may cause the electrical circuit 310 to initiate one or more predetermined operations (645). For example, the control unit 370 may cause the electrical circuit 310 to initiate an emergency power-off retract (EPOR) of the read-write head actuator arm 420. The control unit 370 may then render all of the controlled switches 214a-214d inoperative (650).

The control unit 370 may render all of the controlled switches 214a-214d inoperative by causing the drive circuitry 360 to command the controlled switches 214a-214d to a state that prevents electrical current flow through the controlled terminals of the controlled switches 214a-214d. For example, the drive circuitry 360 may provide a signal to the control terminal 330 of the controlled switch 214a to deactivate the controlled switch 214a, or the controlled switch 214a may otherwise be commanded to a high impedance state.

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

The accompanying claims and their equivalents are intended to cover such forms or modifications as would fall within the scope and spirit of the protection. For example, the example systems and methods disclosed herein can be applied to hard disk drives, hybrid hard drives, and the like. In addition, other forms of storage, for example, but not limited to, DRAM or SRAM, battery backed-up volatile DRAM or SRAM devices, EPROM, EEPROM memory, etc., may additionally or alternatively be used. As another example, the various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An electrical circuit, comprising:
 a plurality of controlled switches, each of the plurality of controlled switches having one or more temperature sensors in thermal contact with each of the plurality of controlled switches, and
 a control unit configured to:
 receive temperature signals from the one or more temperature sensors;
 compare the received temperature signals of each of the plurality of controlled switches to the received temperature signals of every other one of the plurality of controlled switches;
 in response to a variation in the received temperature signals of any of the plurality of controlled switches greater than a predetermined amount compared to the received temperature signals of any other one of the plurality of controlled switches, render the plurality of controlled switches inoperative; and
 in response to the variation in the received temperature signal exceeding the predetermined amount, record an over-temperature event.

2. The electrical circuit of claim 1, wherein the predetermined amount of variation in the received temperature signals is variable based on operating conditions of the electrical circuit.

3. The electrical circuit of claim 1, wherein the control unit is further configured to cause the electrical circuit to initiate one or more predetermined operations prior to rendering the controlled switch inoperative.

4. The electrical circuit of claim 1, wherein the temperature sensors are diode temperature sensors.

5. The electrical circuit of claim 4, wherein the diode temperature sensors are formed on a semiconductor die at opposite corners of a controlled switch structure formed on the semiconductor die.

6. The electrical circuit of claim 1, wherein the control unit is further configured to render the plurality of controlled switches inoperative by commanding the plurality of controlled switches a to a high impedance state.

7. The electrical circuit of claim 1, wherein the rendering the plurality of controlled switches inoperative comprises configuring the plurality of controlled switches so as not to permit electrical current flow through controlled terminals of the plurality of controlled switches.

8. The electrical circuit of claim 1, wherein the controlled switches are field effect transistors (FETs).

9. An electrical circuit, comprising:
 a plurality of field effect transistors (FETs) configured as an H-bridge circuit;
 one or more temperature sensors integrated with each of the plurality of FETs; and
 a control unit configured to:
 receive temperature signals from the one or more temperature sensors;
 compare the received temperature signals from the one or more temperature sensors of each of the plurality of FETs to the received temperature signals from the one or more temperature sensors of every other one of the plurality of FETs;
 in response to a variation in the received temperature signals from the one or more temperature sensors of any one of the plurality of FETs greater than a predetermined amount compared to the received temperature signals from the one or more temperature sensors of any other one of the plurality of FETs, render the plurality of FETs inoperative; and
 in response to the variation in the received temperature signals exceeding the predetermined amount, record an over-temperature event.

10. The electrical circuit of claim 9, wherein the predetermined amount of variation in the received temperature signals is variable based on operating conditions of the electrical circuit.

11. The electrical circuit of claim 9, wherein the control unit is further configured to cause the electrical circuit to initiate one or more predetermined operations prior to rendering the plurality of FETs inoperative.

12. The electrical circuit of claim 9, wherein the one or more temperature sensors are diode temperature sensors.

13. The electrical circuit of claim 12, wherein the diode temperature sensors are formed on a semiconductor die at opposite corners of a FET structure formed on the semiconductor die.

14. The electrical circuit of claim 9, wherein the rendering the plurality of FETs inoperative comprises commanding the plurality of FETs to a high impedance state.

15. The electrical circuit of claim 9, wherein the rendering the plurality FETs inoperative comprises preventing current flow from a drain terminal to a source terminal of each of the plurality of FETs.

16. A method for sensing an overcurrent condition in an electrical circuit, the method comprising:
 monitoring temperature of one or more circuit elements;
 comparing the monitored temperature of each of the one or more circuit elements to the monitored temperature of every other one of the one or more circuit elements;
 in response to a variation in the monitored temperature of any of the one or more circuit elements greater than a predetermined amount compared to the monitored temperature of any other one of the one or more circuit elements, rendering the one or more circuit elements inoperative, and
 in response to the variation in the monitored temperature of any of the one or more circuit elements exceeding the predetermined amount, recording an over-temperature event.

17. The method of claim 16, wherein the predetermined amount of variation in the monitored temperature is variable based on operating conditions of the electrical circuit.

18. The method of claim 16, further comprising, prior to rendering the one or more circuit elements inoperative, causing the electrical circuit to initiate one or more predetermined operations.

19. The method of claim 16, wherein the rendering the one or more circuit elements inoperative comprises configuring the electrical circuit so as not to permit electrical current flow through the one or more circuit elements.

20. A data storage device (DSD), comprising:
 an electrical circuit, comprising:
 a plurality of field effect transistors (FETs) configured as an H-bridge circuit;

one or more temperature sensors integrated with each of the plurality of FETs; and a control unit configured to:

receive temperature signals from the one or more temperature sensors;

compare the received temperature signals from the one or more temperature sensors of each of the plurality of FETs to received temperature signals from the one or more temperature sensors of every other one of the plurality of FETs;

in response to a variation in the received temperature signals from the one or more temperature sensors of any one of the plurality of FETs greater than a predetermined amount compared to the received temperature signals from the one or more temperature sensors of any other one of the plurality of FETs, render the plurality of FETs inoperative; and in response to the variation in the received temperature signals exceeding the predetermined amount, record an over-temperature event.

21. The DSD of claim 20, wherein the predetermined amount of variation in the received temperature signals is variable based on operating conditions of the electrical circuit.

22. The DSD of claim 20, wherein the control unit is further configured to cause the electrical circuit to initiate one or more predetermined operations prior to rendering the plurality of FETs inoperative.

23. The DSD of claim 22, wherein at least one of the predetermined operations is an emergency power-off retract of a read-write head actuator arm.

24. The DSD of claim 20, wherein the one or more temperature sensors are diode temperature sensors.

25. The DSD of claim 24, wherein the diode temperature sensors are formed on a semiconductor die at opposite corners of a FET structure formed on the semiconductor die.

26. The DSD of claim 20, wherein the rendering the plurality of FETs inoperative comprises commanding the plurality of FETs to a high impedance state.

27. The DSD of claim 20, wherein the rendering the plurality FETs inoperative comprises preventing current flow from a drain terminal to a source terminal of each of the plurality of FETs.

* * * * *